United States Patent
Chou et al.

(10) Patent No.: US 9,887,860 B1
(45) Date of Patent: Feb. 6, 2018

(54) TIME-DOMAIN EQUALIZER AND CONTROL METHOD THEREOF

(71) Applicant: MStar Semiconductor, Inc., Hsinchu Hsien (TW)

(72) Inventors: Yu-Shen Chou, Zhubei (TW); Yi-Ying Liao, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 15/456,711

(22) Filed: Mar. 13, 2017

(30) Foreign Application Priority Data

Nov. 22, 2016 (TW) .............................. 105138266 A

(51) Int. Cl.
*H04L 25/03* (2006.01)
*H04L 7/00* (2006.01)
*H04W 52/52* (2009.01)
*H04L 27/26* (2006.01)

(52) U.S. Cl.
CPC ...... *H04L 25/03012* (2013.01); *H04L 7/0033* (2013.01); *H04W 52/52* (2013.01); *H04L 27/265* (2013.01)

(58) Field of Classification Search
CPC .......................... H04L 25/03012; H04L 7/0033
USPC .......................................................... 375/348
See application file for complete search history.

(56) References Cited

U.S. PATENT DOCUMENTS

2005/0259767 A1* 11/2005 Garmany ............... H04B 7/005
375/343
2010/0002796 A1* 1/2010 Zhang .................. H04L 27/2607
375/267

* cited by examiner

*Primary Examiner* — Michael Neff
(74) *Attorney, Agent, or Firm* — Edell, Shapiro & Finnan, LLC

(57) ABSTRACT

A time-domain equalizer for eliminating an echo signal from a received signal is provided. The received signal includes an original signal and the echo signal. The time-domain equalizer includes a time delay estimator, an amplitude amplifying ratio estimator and a phase shift estimator. The time delay estimator determines a delay amount maximizing a cost function to serve as an estimated delay amount of the echo signal relative to the original signal. The amplitude amplifying ratio estimator determines an estimated amplitude amplifying ratio of the echo signal relative to the original signal. The phase shift estimator determines an estimated phase shift of the echo signal relative to the original signal according to the estimated delay amount. The estimated delay amount, the estimated amplitude amplifying ratio and the estimated phase shift are used to set a filtering condition to be applied to the received signal.

12 Claims, 2 Drawing Sheets

TIME-DOMAIN EQUALIZER AND CONTROL METHOD THEREOF

This application claims the benefit of Taiwan application Serial No. 105138266, filed Nov. 22, 2016, the subject matter of which is incorporated herein by reference.

BACKGROUND OF THE INVENTION

Field of the Invention

The invention relates in general to a time-domain equalizer, and more particularly to a method for determining a parameter in a time-domain equalizer.

Description of the Related Art

The orthogonal frequency-division multiplexing (OFDM) technology, featuring a high spectrum utilization rate and a simple hardware architecture, is extensively applied in communication system in the recent years. An OFDM signal is formed by multiple symbols. To prevent inter-symbol interference (ISI) caused by a multipath, a guard interval is provided at a front part of these symbols. However, in a more complex communication environment, a propagation delay amount exceeding the length of the guard interval may still exist to cause ISI and hence degraded overall system performance. Such issue cannot be solved by frequency-domain equalization techniques, and an additional time-domain equalizer is required before a frequency-domain equalizer of a receiver. Only when delay amounts in arrival time points, amplitude amplifying ratios and phase shift amounts of echo signals in a multipath relative to an original signal are correctly estimated, and the time-domain equalizer is accordingly configured, the interference that the echo signals cause on the original signal may then be effectively eliminated or minimized.

SUMMARY OF THE INVENTION

The invention is directed to a time-domain equalizer and a control method thereof. By defining an appropriate cost function as a basis for estimation, the time-domain equalizer and control method of the present invention are capable of estimating a time delay amount of an echo signal relative to an original signal. Further, according to the estimated delay amount, an amplitude amplifying ratio and a phase shift of the echo signal relative to the original signal may also be determined.

According to an embodiment of the present invention, a time-domain equalizer for eliminating an echo signal from a received signal is provided. The received signal includes an original signal and the echo signal. The time-domain equalizer includes a time delay estimator, an amplitude amplifying ratio estimator and a phase shift estimator. The time delay estimator first determines a delay amount that maximizes a cost function to serve as an estimated delay amount of the echo signal relative to the original signal. The amplitude amplifying ratio estimator determines an estimated amplitude amplifying ratio of the echo signal relative to the original signal according to the estimated delay amount. The phase shift estimator determines an estimated phase shift of the echo signal relative to the original signal according to the estimated delay amount. The cost function is:

$$C(\tau) = \left\| \sum_k y[k] y^*[k | \tau] \right\|^2$$

In the equation above, y[k] represents the received signal, k represents a sampling index, a signal y[k+τ] represents a delayed signal after the received signal is delayed by a time delay τ, and y*[k+τ] represents a conjugate of the delayed signal.

A control method for a time-domain equalizer is provided according to another embodiment of the present invention. The time-domain equalizer is for eliminating an echo signal from a received signal. The received signal includes an original signal and the echo signal. In the method, a delay amount that maximizes a cost function is first determined to serve as an estimated delay amount of the echo signal relative to the original signal. According to the estimated delay amount, an estimated amplitude amplifying ratio and an estimated phase shift of the echo signal relative to the original signal are determined. The estimated delay amount, the estimated amplitude amplifying ratio and the estimated phase shift are used to set a filtering condition to be applied to the received signal. The cost function is:

$$C(\tau) = \left\| \sum_k y[k] y^*[k + \tau] \right\|^2$$

In the equation above, y[k] represents the received signal, k represents a sampling index, a signal y[k+τ] represents a delayed signal after the received signal is delayed by a time delay τ, and y*[k+τ] represents a conjugate of the delayed signal.

The above and other aspects of the invention will become better understood with regard to the following detailed description of the preferred but non-limiting embodiments. The following description is made with reference to the accompanying drawings.

Figure 1:
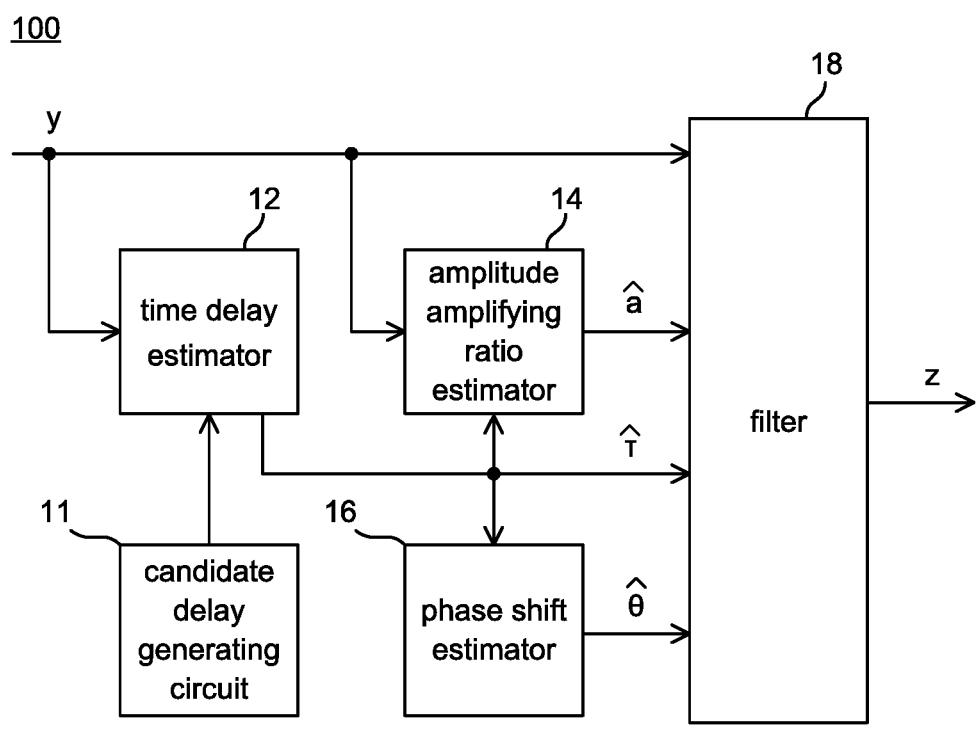
FIG. 1 is a functional block diagram of a time-domain equalizer according to an embodiment of the present invention.

It should be noted that, the drawings of the present invention include functional block diagrams of multiple functional modules related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

In a signal model adopted in the present invention, an original signal transmitted from a transmitter is denoted as a symbol x, and a received signal received at a receiver is denoted as a symbol y. Without considering a symbol timing offset and a frequency offset, the received signal y having passed a multipath may be represented as:

$$y[k] = x[k] + \sum_{p=1}^{P} a_p e^{j\theta_{p,k}} x[k-(M_p+\Delta_p)] + n[k] \quad (1)$$

In equation (1), k represents a sampling index, and P represents a total number of echo signals caused by a multipath propagation channel from the transmitter to the receiver. It is seen from equation (1) that, the received signal y is a sum of the original signal x and the P echo signals. The symbols $a_p$, $\theta_p$, k, and ($M_p+\Delta_p$) respectively represent an amplitude amplifying ratio, a phase shift and an arrival time delay amount of the $p^{th}$ echo signal relative to the original signal, where P is a positive integer, and p is an integral index between 1 and P. Further, n[k] represents a noise signal. The arrival time delay amount ($M_p+\Delta_p$) includes two components, where $M_p$, as an approximate delay amount of the $p^{th}$ echo signal, is known to the receiver through inverse fast Fourier transform (IFFT), and $\Delta_p$, as a fine delay amount, is difficult to measure.

According to equation (1), a conversion function between the original signal x and the received signal y received at the receiver may be defined as:

$$H = \frac{Y}{X} = 1 + \sum_{p=1}^{P} \alpha_p e^{j\theta_{p,k}} Z^{-(M_p+\Delta_p)} \quad (2)$$

A design target of the time-domain equalizer of the present invention is to minimize the echo signal in the signal y, i.e., making a conversion function Z/X between an output signal z of the time-domain equalizer and the original signal x to approach 1. Thus, an ideal conversion function Z/Y is deduced as:

$$\frac{Z}{Y} = \frac{1}{1 + \sum_{p=1}^{P} \alpha_p e^{j\theta_{p,k}} Z^{-(M_p+\Delta_p)}} \quad (3)$$

Correspondingly, an ideal output signal z of the time-domain equalizer is:

$$z[k] = y[k] - \sum_{p=1}^{P} \alpha_p e^{j\theta_{p,k}} z[k-(M_p+\Delta_p)] \quad (4)$$

FIG. 1 shows a functional block diagram of a time-domain equalizer according to an embodiment of the present invention. A time-domain equalizer 100 estimates an arrival time delay amount, an amplitude amplifying ratio and a phase shift for each echo signal compared to the original signal x to serve as basis for adjusting the received signal y. As shown in FIG. 1, the time-domain equalizer 100 includes a candidate delay generating circuit 11, a time delay estimator 12, an amplitude amplifying ratio estimator 14, a phase shift estimator 16 and a filter 18. Operation details of the above circuits are described below.

For one echo signal, the time delay estimator 12 first determines a time delay amount that maximizes a cost function to serve an estimated delay $\hat{\tau}$ of the echo signal relative to the original signal x. The cost function is:

$$C(\tau) = \left\| \sum_k y[k] y^*[k+\tau] \right\|^2 \quad (5)$$

In equation (5), k represents a sampling index, y[k] is the $k^{th}$ sample of the received signal y, a signal y[k+τ] represents a delayed signal after the received signal y[k] is delayed by a time delay τ, and y*[k+τ] represents a conjugate of the delayed signal y[k+τ]. The delayed signal y[k+τ] is generated according to the signal y[k] by the time delay estimator 12, and the delay amount τ is a variable controlled by the time delay estimator 12. The calculation in equation (5) may be regarded as calculating the correlation between the signal y[k] and the delayed signal y[k+τ], and accumulating the correlation result over a period. Theoretically, as the delay amount τ that the time delay estimator 12 adopts gets closer to the actual delay amount of the echo signal, the correlation of the signal y[k] and the delayed signal y[k+τ] is higher, which means the calculation result of equation (5) becomes larger. Thus, the time delay estimator 12 is designed to use the delay amount τ that maximizes the cost function C(τ) as the estimated delay amount $\hat{\tau}$ of the echo signal relative to the original signal.

The candidate delay generating circuit 11 may select in advance or in real-time a plurality of candidate delay amounts, and provide these candidate delay amounts to the time delay estimator 12. As previously described, the approximate delay amount $M_p$ of the $p^{th}$ echo signal is known to the receiver through IFFT, but the fine delay amount $\Delta_p$ is difficult to measure. For each echo signal, the candidate delay generating circuit 11 may first determine the approximate delay amount, and select the candidate delay amounts from a nearby range of the approximate delay amount. For example, assume that the nearby range is ($M_p-\tau_{min}$) to ($M_p+\tau_{max}$), and ten candidate delay amounts $\tau_0$ to $\tau_9$ are to be selected. Thus, the candidate delay amount $\tau_0$ is made to equal to ($M_p-\tau_{min}$), the candidate delay amount $\tau_9$ is made to equal to ($M_p+\tau_{max}$), and the other eight incremental, equal-interval candidate delay amounts $\tau_1$ to $\tau_8$ are generated by interpolation between the candidate delay amounts $\tau_0$ to $\tau_9$.

In practice, there are numerous approaches for the time delay estimator 12 to determine the delay amount τ that maximizes the cost function C(τ). Several of these approaches are described in the embodiments below. It should be noted that the present invention is not limited to these exemplary approaches.

In one embodiment, the time delay estimator 12 may generate ten delayed signals of the received signal y according to the candidate delay amounts $\tau_0$ to $\tau_9$, and generate ten cost function calculation results C($\tau_0$) to C($\tau_9$) according to these ten delayed signals and the received signal y. According to the cost function calculation results C($\tau_0$) to C($\tau_9$), the time delay estimator 12 selects the candidate delay amount that is capable of generating a maximum cost function calculation result to serve as the estimated delay amount $\hat{\tau}$. For example, if C($\tau_3$) is the maximum cost function calculation result among the cost function calculation results C($\tau_0$) to C($\tau_9$), the time delay estimator 12 may select the delay amount $\tau_3$ as the estimated delay amount $\hat{\tau}$.

In another embodiment, a partial differentiation function C'(τ) generated from performing partial differentiation on the cost function C(τ) by using the delay amount τ as a partial derivative is provided in advance. The time delay estimator 12 substitutes a plurality of candidate delay amounts into the partial differentiation function C'(τ) to generate a plurality of partial differentiation calculation results, e.g., C'($\tau_0$) to C'($\tau_9$), respectively. Next, the time delay estimator 12 selects the candidate delay amount that is capable of generating a partial differentiation calculation result closest to zero to serve as the estimated delay amount $\hat{\tau}$. In other words, among the differentiation calculation results C'($\tau_0$) to C'($\tau_9$), if C'($\tau_3$) is the partial differentiation calculation result closest to zero, the time delay estimator 12 selects the delay amount $\tau_3$ as the estimated delay amount $\hat{\tau}$.

In another embodiment, similarly, a partial differentiation function C'($\tau$) generated from performing partial differentiation on the cost function C($\tau$) by using the delay amount $\tau$ as a partial derivative is provided in advance. The time delay estimator 12 first substitutes a plurality of candidate delay amounts into the cost function C($\tau$) to generate a plurality of cost function calculation results, e.g., C($\tau_0$) to C($\tau_9$), respectively. Next, according to the cost function calculation results, e.g., C($\tau_0$) to C($\tau_9$), the time delay estimator 12 selects the candidate delay amount that generates a maximum cost function calculation result as a preliminary estimated delay amount, and accordingly calculates a more precise estimated delay amount t (it must be close to the preliminary estimated delay amount). Taking the delay amount $\tau_3$ selected as the preliminary delay amount for example, the time delay estimator 12 substitutes the preliminary delay amount $\tau_3$ into the partial differentiation function C'($\tau$) to generate a first partial differentiation result C'($\tau_3$). Assume that the candidate delay amounts $\tau_0$ to $\tau_9$ are arranged in an increasing order. It is understandable that, when the first partial differentiation result C'($\tau_3$) is greater than zero, the delay amount maximizing the cost function C($\tau$) (i.e., a delay amount that causes the corresponding partial differentiation result to be substantially zero) much likely occurs between the candidate delay amounts $\tau_3$ and $\tau_4$, and the partial differential result C'($\tau_4$) corresponding to the candidate delay amount $\tau_4$ is much likely smaller than zero. On the other hand, when the first partial differentiation result C'($\tau_3$) is smaller than zero, the delay amount maximizing the cost function C($\tau$) (i.e., a delay amount also causes the corresponding partial differentiation result to be substantially zero) likely occurs between the candidate delay amounts $\tau_2$ and $\tau_3$, and the partial differential result C'($\tau_4$) corresponding to the candidate delay amount $\tau_4$ is much likely greater than zero. Thus, according to a sign(+/−) of the first partial differentiation result C'($\tau_3$), the time delay estimator 12 may select another reference delay amount from the plurality of candidate delay amounts $\tau_0$ to $\tau_9$. For example, when the first partial differentiation result C'($\tau_3$) is greater than zero, the time delay estimator 12 may select the candidate delay amount $\tau_4$ as another reference delay amount, and substitute the reference delay amount $\tau_4$ into the partial differentiation function C'($\tau$) to generate a second partial differentiation result C'($\tau_4$). The time delay estimator 12 then interpolates the first partial differentiation result C'($\tau_3$) and the second partial differentiation result C'($\tau_4$) to generate a delay amount that causes the partial differentiation result to be substantially zero to serve as the estimated delay amount $\hat{\tau}$.

It should be noted that, in practice, the above candidate delay amount need not correspond to an integral sampling index k; for example, the candidate delay amount may correspond to a sampling index k=1.5 or k=1.75. More specifically, to generate a non-integral sampling index k, the candidate delay amount that the time delay estimator 12 adopts may be generated according to multiple delay amounts corresponding to one-stage or multi-stage interpolation on the integral sampling index k. An example of generating a candidate delay amount by a two-stage interpolation process is given below.

In the first stage of the interpolation, multiple preliminary interpolation results y(k+$t_j$) are generated. For example, five preliminary interpolation results y(k+$t_j$) may be generated from linearly combining respective received signals y corresponding to five preliminary delay amounts $t_0$ to $t_4$:

$$y(k+t_j) = \Sigma_m b_m^{(j)} y(k+M_j+m) \tag{6}$$

In equation (6), j is an integral index between 0 and 4, $b_m^{(j)}$ is a weighting coefficient and is different for individual delay amounts $t_j$, and $M_j$ is a basic delay amount (unrelated to $t_j$).

In the second stage of the interpolation, multiple second-stage interpolation results y(k+$\tau_i$) are generated. For example, 11 second-stage interpolation results y(k+$\tau_i$) may be generated according to y(k+$t_j$) obtained from equation (6):

$$y(k+\tau_i) = \Sigma_j c_j^{(i)} y(k+t_j) \tag{7}$$

In equation (7), i is an integral index between 0 and 10, $c_j^{(i)}$ is a weighting coefficient and is different for individual delay amounts $t_j$.

By combining equation (6) and equation (7), the cost function C($\tau_i$) may be expanded as below:

$$C(\tau_i) = \left\| \sum_k y[k] y^*[k+\tau_i] \right\|^2 \tag{8}$$

$$= \left\| \sum_k y[k] \left[ \sum_i c_j^{(i)} y(k+t_j) \right]^* \right\|^2$$

$$= \left\| \sum_k y[k] \left[ \sum_j c_j^{(i)} \sum_m b_m^{(j)} y(k+M_j+m) \right]^* \right\|^2$$

$$= \left\| \sum_j c_j^{(i)} \sum_k y[k] \left[ \sum_m b_m^{(j)} y(k+M_j+m) \right]^* \right\|^2$$

$$= \left\| \sum_j c_j^{(i)} A_{k,echo} \right\|$$

Wherein, $$A_{k,echo} = \left\| \sum_k y[k] \left[ \sum_m b_m^{(j)} y(k \mid M_j \mid m) \right]^* \right\|^2 \tag{9}$$

According to equation (8) and equation (9), the partial differentiation function C'($\tau_i$) may be deduced:

$$C'^{(\tau_i)} = \frac{d}{d\tau} \left\| \sum_j c_j^{(i)} A_{k,echo} \right\|^2 \tag{10}$$

$$= \left( \sum_j c_i'^{(i)} A_{k,I} \right) \left( \sum_j c_i^{(i)} A_{k,I} \right) + \left( \sum_j c_i'^{(i)} A_{k,Q} \right) \left( \sum_j c_j^{(i)} A_{k,Q} \right)$$

In equation (10), $A_{k,I}$ and $A_{k,Q}$ respectively correspond to an in-phase component and a quadrature-phase component in the signal. In practice, the coefficients $c_j'^{(j)}$ and $c_j^{(i)}$ may be calculated and stored in a memory in advance as reference data for the use of the time delay estimator 12.

After the time delay estimator 12 generates the estimated delay amount $\hat{\tau}$ for the echo signal, the amplitude amplifying ratio estimator 14 determines an estimated amplitude amplifying ratio $\hat{a}$ of the echo signal relative to the original signal x according to the estimated delay amount $\hat{\tau}$. In one embodiment, the amplitude amplifying ratio estimator 14 determines the estimated amplitude amplifying ratio according to an equation below:

$$\hat{\alpha} = \frac{|C(\hat{\tau})|}{\left|\sum_{k \in GI} y[k]y^*[k+\mu]\right|} \quad (11)$$

In equation (11), k∈GI means that the amplitude amplifying ratio is calculated according to a sampling result corresponding to a guard interval of the original signal x, $\hat{\tau}$ represents the estimated delay amount generated by the time delay estimator 12, and μ represents a length of fast Fourier transform (FFT) that the time-domain equalizer 100 performs on the received signal y. In practice, the value $|C(\hat{\tau})|$ that is generated earlier by the time delay estimator 12 is provided to the amplitude amplifying ratio estimator 14.

Further, after the delay estimator 12 generates the estimated delay amount $\hat{\tau}$ for the echo signal, the phase shift estimator 16 determines an estimated phase shift $\hat{\theta}$ of the echo signal relative to the original signal x according to the estimated delay amount $\hat{\tau}$. In one embodiment, the phase shift estimator 16 identifies a phase angle (or referred to as an argument) of the calculation result $C(\hat{\tau})$ as the estimated phase shift $\hat{\theta}$. In practice, the calculation result $C(\hat{\tau})$ is already generated earlier by the time delay estimator 12, and may be directly provided to the phase shift estimator 16.

The filter 18 sets a filtering condition to be applied on the received signal y according to the estimated delay amount $\hat{\tau}$, the estimated amplitude amplifying ratio $\hat{a}$ and the estimated phase shift $\hat{\theta}$ of each of the echo signals. Without departing from the spirit of the present invention, multiple configurations and elements choices are capable of realizing the candidate delay generating circuit 11, the time delay estimator 12, the amplitude amplifying ratio estimator 14 and the phase shift estimator 16, e.g., fixed and programmable logic circuits, programmable logic gate arrays, application-specific integrated circuits, microcontrollers, microprocessors, and digital signal processors. Further, these estimators may also be designed to complete respective tasks through executing processor instructions stored in a memory.

Figure 2:
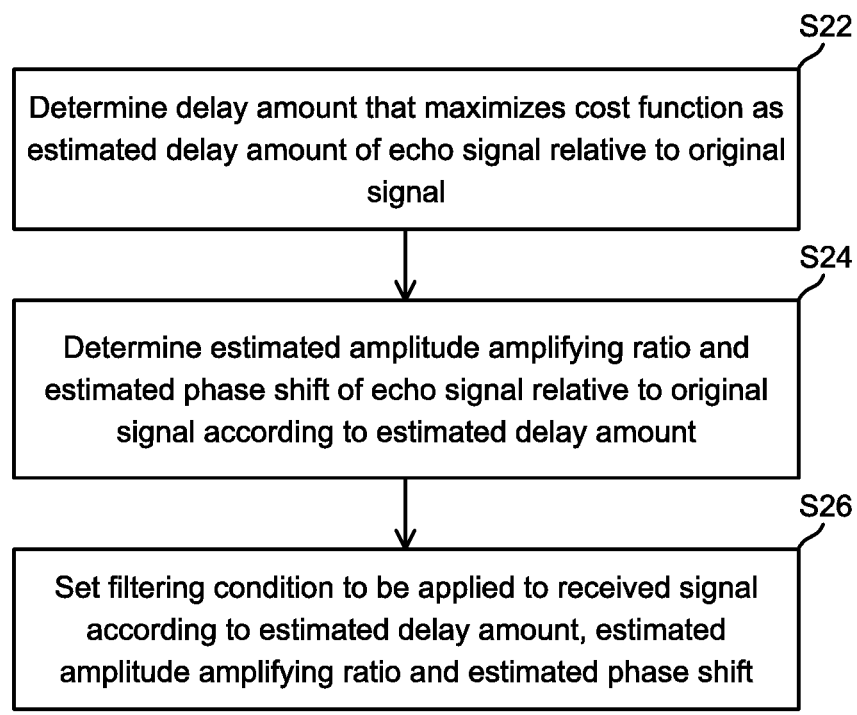
FIG. 2 is a flowchart of a control method for a time-domain equalizer according to another embodiment of the present invention.

A control method for a time-domain equalizer is further provided according to another embodiment of the present invention. FIG. 2 shows a flowchart of the control method. The time-domain equalizer is for eliminating an echo signal from a received signal. The received signal includes an original signal and the echo signal. In step S22, a delay amount that maximizes a cost function is determined to serve as an estimated delay amount of the echo signal relative to the original signal. In step S24, according to the estimated delay amount, an estimated amplitude amplifying ratio and an estimated phase shift of the echo signal relative to the original signal are determined. In step S26, the estimated delay amount, the estimated amplitude amplifying ratio and the estimated phase shift are used to set a filtering condition to be applied to the received signal. In step S22, the cost function is:

$$C(\tau) = \left\|\sum_k y[k]y^*[k+\tau]\right\|^2$$

In the equation above, y[k] represents the received signal, k represents a sampling index, a signal y[k+τ] represents a delayed signal after the received signal y[k] is delayed by a time delay τ, and y*[k+τ] represents a conjugate of the delayed signal y[k+τ].

One person skilled in the art can understand that, the operation variations in the description associated with the time-domain equalization 100 are applicable to the control method in FIG. 2, and shall be omitted herein.

It should be noted that, the mathematical expressions in the disclosure are for illustrating principles and logics associated with the embodiments of the present invention. Unless otherwise specified, these mathematical expressions do not levy limitations to the present invention. One person skilled in the art can understand that, there are various other technologies capable of realizing the physical forms corresponding to these mathematical expressions.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A time-domain equalizer, for eliminating an echo signal from a received signal, the received signal comprising an original signal and the echo signal, the time-domain equalizer comprising:
   a time delay estimator, determining a delay amount that maximizes a cost function to serve as an estimated delay amount of the echo signal relative to the original signal;
   an amplitude amplifying ratio estimator, determining an estimated amplitude amplifying ratio of the echo signal, relative to the original signal, according to the estimated delay amount; and
   a phase shift estimator, determining an estimated phase shift of the echo signal, relative to the original signal, according to the estimated delay amount;
   wherein, the cost function is:

$C(\tau)=\|\Sigma_k y[k]y^*[k+\tau]\|^2$, where y[k] represents the received signal, k represents a sampling index, a signal y[k+τ] represents a delayed signal after the received signal is delayed by a time delay τ, and y*[k+τ] represents a conjugate of the delayed signal.

2. The time-domain equalizer according to claim 1, wherein the amplitude amplifying ratio estimator determines the estimated amplitude amplifying ratio according to an equation:

$$\hat{\alpha} = \frac{|C(\hat{\tau})|}{\left|\sum_{k \in GI} y[k]y^*[k+\mu]\right|},$$

where k∈GI represents that the amplitude amplifying ratio is calculated according to a sampling result corresponding to a guard interval of the original signal x, $\hat{\tau}$ represents the estimated delay amount generated by the time delay estimator, µ represents a length of fast Fourier transform (FFT) and y*[k+µ] represents a conjugate of another signal y delayed by FFT length µ.

3. The time-domain equalizer according to claim 1, wherein the phase shift estimator determines a phase angle of a cost function calculation result C($\hat{\tau}$) to serve as the estimated phase shift, and $\hat{\tau}$ represents the estimated delay amount generated by the time delay estimator.

4. The time-domain equalizer according to claim 1, wherein the time delay estimator:
   substitutes a plurality of candidate delay amounts into the cost function to generate a plurality of cost function calculation results, respectively; and
   selects the candidate delay amount that generates a maximum cost function calculation result as the estimated delay amount according to the plurality of cost function calculation results.

5. The time-domain equalizer according to claim 1, wherein a partial differentiation function is provided in advance, which is a result of partial differentiation of the cost function using the delay amount τ as a partial derivative; and the time delay estimator:
   substitutes a plurality of candidate delay amounts into the partial differentiation function to generate a plurality of partial differentiation calculation results, respectively; and
   selects the candidate delay amount that generates a partial differentiation calculation result that is closest to zero as the estimated delay amount according to the plurality of partial differential calculation results.

6. The time-domain equalizer according to claim 1, wherein a partial differentiation function is provided in advance, which is a result of partial differentiation of the cost function using the delay amount τ as a partial derivative; the time delay estimator:
   substitutes a plurality of candidate delay amounts into the cost function to generate a plurality of cost function calculation results, respectively;
   selects the candidate delay amount capable of generating a maximum cost function calculation result as a preliminary estimated delay amount according to the plurality of cost function calculation results;
   substitutes the preliminary estimated delay amount into the partial differentiation function to generate a first partial differentiation result;
   selects a reference delay amount from the plurality of candidate delay amounts according to a sign of the first partial differentiation result;
   substitutes the reference delay amount into the partial differentiation function to generate a second partial differentiation result; and
   generates the estimated delay amount by performing interpolation according to the first partial differentiation result and the second partial differentiation result.

7. A control method for a time-domain equalizer, the time-equalizer for eliminating an echo signal from a received signal, the received signal comprising an original signal and the echo signal, the control method comprising:
   a) determining a delay amount that maximizes a cost function to serve as an estimated delay amount of the echo signal relative to the original signal;
   b) determining an estimated amplitude amplifying ratio and an estimated phase shift of the echo signal relative to the original signal according to the estimated delay amount; and
   c) setting a filtering condition to be applied to the received signal according to the estimated delay amount, the estimated amplitude amplifying ratio and the estimated phase shift;
   wherein, the cost function is:

$$C(\tau)=\|\Sigma_k y[k]y^*[k+\tau]\|^2,$$

where y[k] represents the received signal, k represents a sampling index, a signal y[k+τ] represents a delayed signal after the received signal is delayed by a time delay τ, and y*[k+τ] represents a conjugate of the delayed signal.

8. The control method according to claim 7, wherein step (b) determines the estimated amplitude amplifying ratio according to an equation:

$$\hat{\alpha} = \frac{|C(\hat{\tau})|}{\left|\sum_{k \in GI} y[k]y^*[k+\mu]\right|},$$

where k∈GI represents that the amplitude amplifying ratio is calculated according to a sampling result corresponding to a guard interval of the original signal x, $\hat{\tau}$ represents the estimated delay amount generated in step (a), µ represents a length of fast Fourier transform (FFT) and y*[k+µ] represents a conjugate of another signal y delayed by FFT length µ.

9. The control method according to claim 7, wherein step (b) comprises:
   determining a phase angle of a cost function calculation result C($\hat{\tau}$) to serve as the estimated phase shift, where $\hat{\tau}$ represents the estimated delay amount.

10. The control method according to claim 7, wherein step (a) comprises:
   substituting a plurality of candidate delay amounts into the cost function to generate a plurality of cost function calculation results, respectively; and
   selecting the candidate delay amount that generates a maximum cost function calculation result to serve as the estimated delay amount according to the plurality of cost function calculation results.

11. The control method according to claim 7, wherein a partial differentiation function is provided in advance, which is a result of partial differentiation of the cost function using the delay amount τ as a partial derivative; and step (a) comprises:
   substituting a plurality of candidate delay amounts into the partial differentiation function to generate a plurality of partial differentiation calculation results, respectively; and
   selecting the candidate delay amount that generates a partial differentiation calculation result that is closest to zero as the estimated delay amount according to the plurality of partial differential calculation results.

12. The control method according to claim 7, wherein a partial differentiation function is provided in advance, which is a result of partial differentiation of the cost function using the delay amount τ as a partial derivative; and step (a) comprises:
   substituting a plurality of candidate delay amounts into the cost function to generate a plurality of cost function calculation results, respectively;
   selecting the candidate delay amount capable of generating a maximum cost function calculation result as a preliminary estimated delay amount according to the plurality of cost function calculation results;
substituting the preliminary estimated delay amounts into the partial differentiation function to generate a first partial differentiation result;
selecting a reference delay amount from the plurality of candidate delay amounts according to a sign of the first partial differentiation result;
substituting the reference delay amount into the partial differentiation function to generate a second partial differentiation result; and
generating the estimated delay amount by performing interpolation according to the first partial differentiation result and the second partial differentiation result.

* * * * *